(12) United States Patent
Howell et al.

(10) Patent No.: US 10,467,595 B2
(45) Date of Patent: Nov. 5, 2019

(54) PREDICTION TOOL

(71) Applicant: The Prudential Insurance Company of America, Newark, NJ (US)

(72) Inventors: Marcus Samuel Howell, Elverson, PA (US); Isaac Moussa Bayoh, Budd Lake, NJ (US)

(73) Assignee: The Prudential Company of America, Newark, NJ (US)

( * ) Notice: Subject to any disclaimer, the term of this patent is extended or adjusted under 35 U.S.C. 154(b) by 254 days.

(21) Appl. No.: 15/207,053

(22) Filed: Jul. 11, 2016

(65) Prior Publication Data

US 2018/0012187 A1 Jan. 11, 2018

(51) Int. Cl.
*G06Q 10/10* (2012.01)

(52) U.S. Cl.
CPC .............................. *G06Q 10/1053* (2013.01)

(58) Field of Classification Search
CPC combination set(s) only.
See application file for complete search history.

(56) References Cited

U.S. PATENT DOCUMENTS

| 8,396,775 B1* | 3/2013 | Mindlin | G06Q 40/06 705/35 |
| 2016/0189106 A1* | 6/2016 | Fraungruber | G06Q 10/1057 705/7.22 |
| 2016/0358258 A1* | 12/2016 | Dintenfass | G06Q 40/06 |

OTHER PUBLICATIONS

The New Reality of Employee Benefits;MassMutual Life Insurance Co.; 4 pages.

* cited by examiner

*Primary Examiner* — Mark A Fleischer
(74) *Attorney, Agent, or Firm* — Baker Botts L.L.P.

(57) ABSTRACT

A system includes a memory, a prediction engine, and an offer engine. The memory stores a plurality of salaries and an average salary for each age group. The prediction engine determines that a first user is of a first age that belongs in a first age group and predicts, based on the salaries for the users in a second age group different from the first age group, a percentage of the average salary for the second age group that the first user will make at a second age greater than the first age. The prediction engine also determines a probability that the first user will retire at the second age based on the predicted percentage. The offer engine determines an amount of money that will increase the determined probability above a threshold and displays the amount of money, the determined probability, and the predicted percentage.

18 Claims, 3 Drawing Sheets

PREDICTION TOOL

TECHNICAL FIELD

This disclosure relates generally to improving processor and memory resource usage.

BACKGROUND

When an employee retires from an enterprise, many processes and services are performed that can stress the processor and memory resources of the computing systems of the enterprise. This problem is exacerbated when the employee retires at an inopportune or unexpected time for the enterprise (e.g., when the enterprise cannot replace the employee).

SUMMARY OF THE DISCLOSURE

According to an embodiment, a system includes a memory, a prediction engine, and an offer engine. The memory stores a plurality of salaries. Each salary of the plurality of salaries is a salary for a user of a plurality of users. Each user of the plurality of users assigned to an age group of a plurality of age groups. The memory also stores an average salary for each age group of the plurality of age groups. The prediction engine determines that a first user is of a first age that belongs in a first age group of the plurality of age groups and predicts, based on the salaries for the users in a second age group different from the first age group, a percentage of the average salary for the second age group that the first user will make at a second age greater than the first age. The prediction engine also determines a probability that the first user will retire at the second age based on the predicted percentage of the average salary. The offer engine determines an amount of money that, if given to the first user, will increase the determined probability above a threshold and displays the amount of money, the determined probability, and the predicted percentage.

According to another embodiment, a method includes storing a plurality of salaries. Each salary of the plurality of salaries is a salary for a user of a plurality of users. Each user of the plurality of users assigned to an age group of a plurality of age groups. The method also includes storing an average salary for each age group of the plurality of age groups and determining that a first user is of a first age that belongs in a first age group of the plurality of age groups. The method further includes predicting, based on the salaries for the users in a second age group different from the first age group, a percentage of the average salary for the second age group that the first user will make at a second age greater than the first age and determining a probability that the first user will retire at the second age based on the predicted percentage of the average salary. The method also includes determining an amount of money that, if given to the first user, will increase the determined probability above a threshold and displaying the amount of money, the determined probability, and the predicted percentage.

According to yet another embodiment, an apparatus includes a prediction engine and an offer engine. The prediction engine determines that a first user is of a first age that belongs in a first age group of a plurality of age groups and predicts, based on stored salaries for users in a second age group different from the first age group, a percentage of an average salary for the second age group that the first user will make at a second age greater than the first age. The prediction engine also determines a probability that the first user will retire at the second age based on the predicted percentage of the average salary. The offer engine determines an amount of money that, if given to the first user, will increase the determined probability above a threshold and displays the amount of money, the determined probability, and the predicted percentage.

Certain embodiments provide one or more technical advantages. For example, an embodiment improves the processor and memory resource usage of an enterprise by predicting and preparing for an employee leaving the enterprise. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
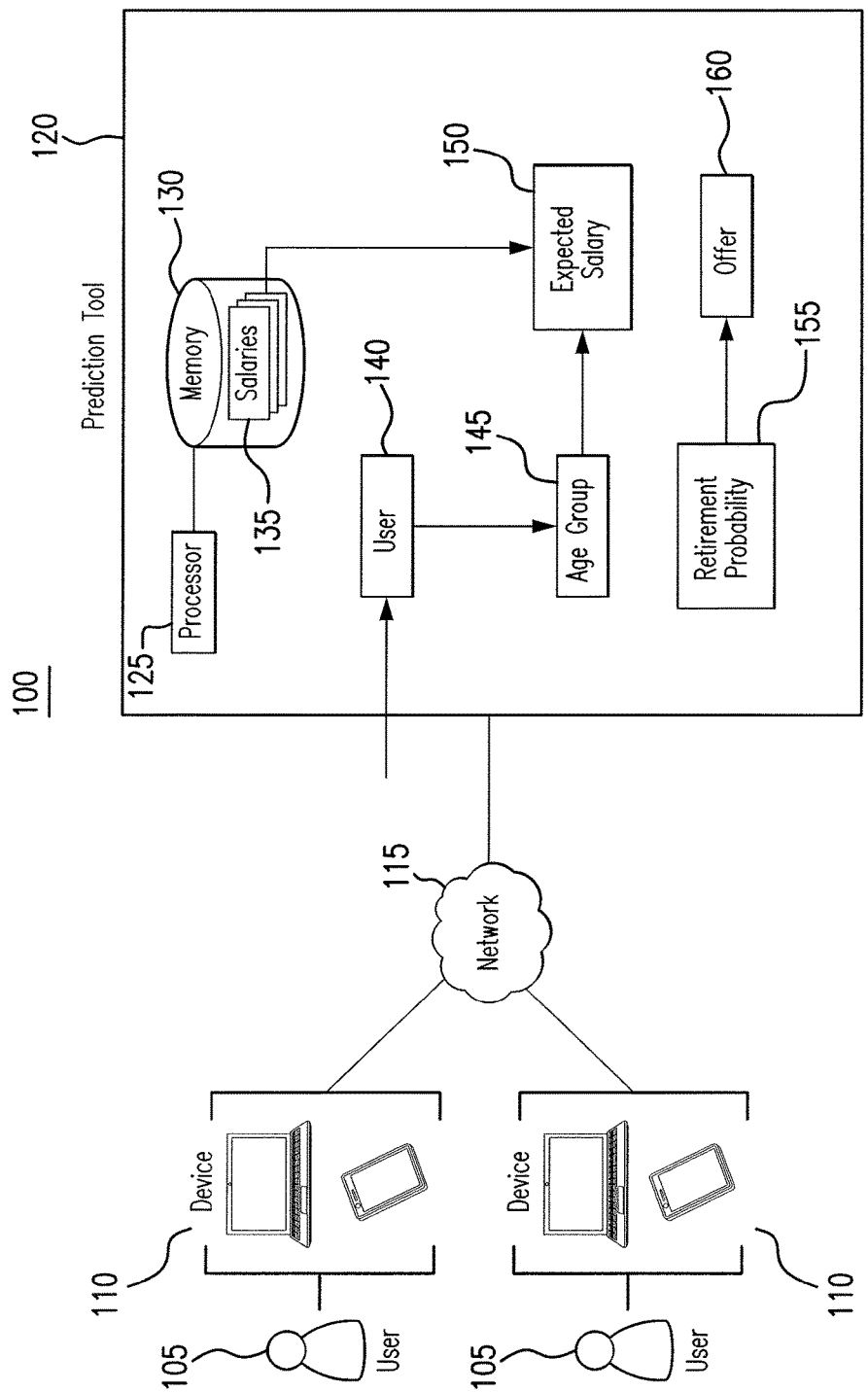
FIG. 1 illustrates a system for improving processor and memory usage.
Figure 2:
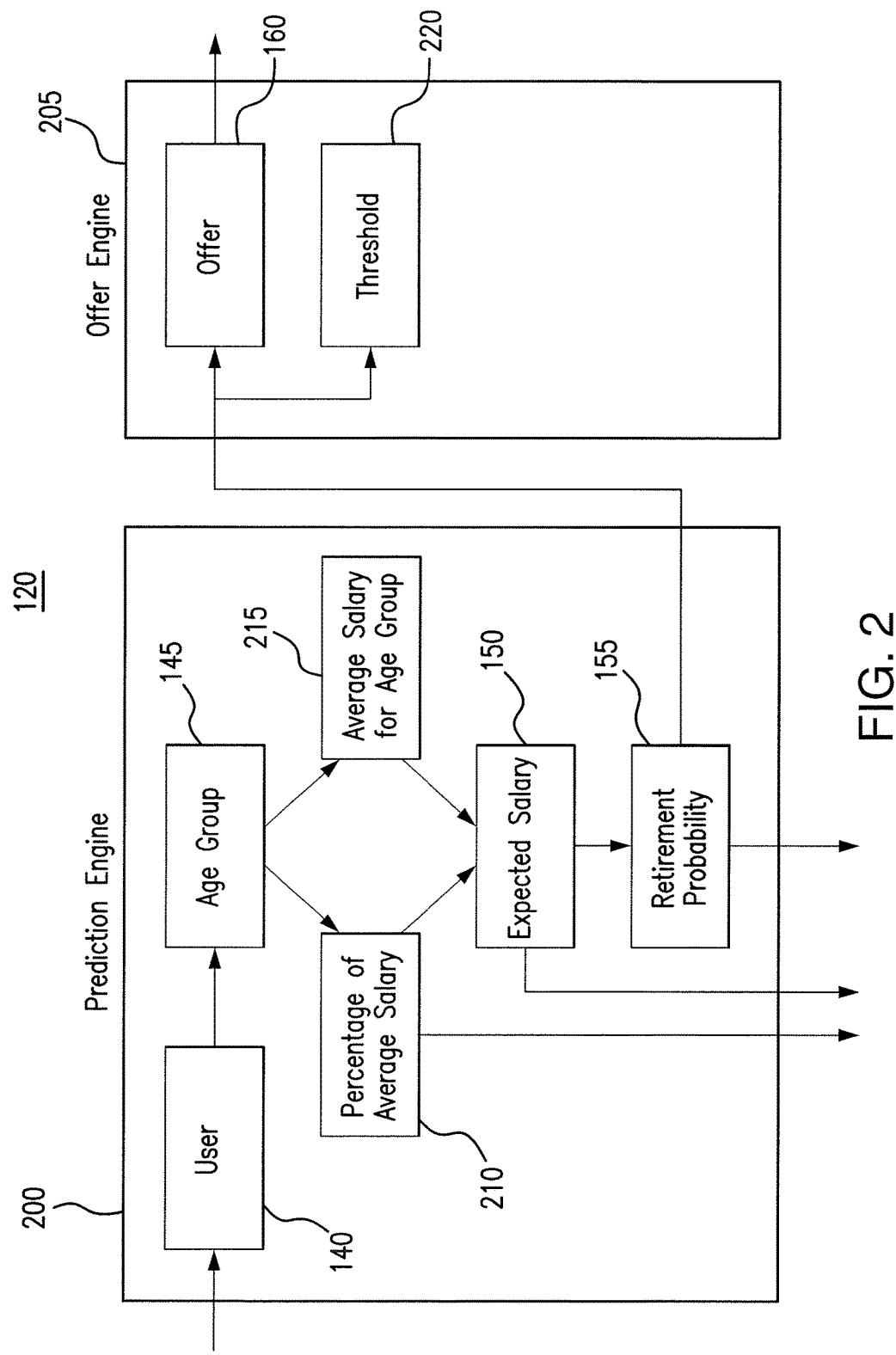
FIG. 2 illustrates the prediction tool of the system of FIG. 1.
Figure 3:
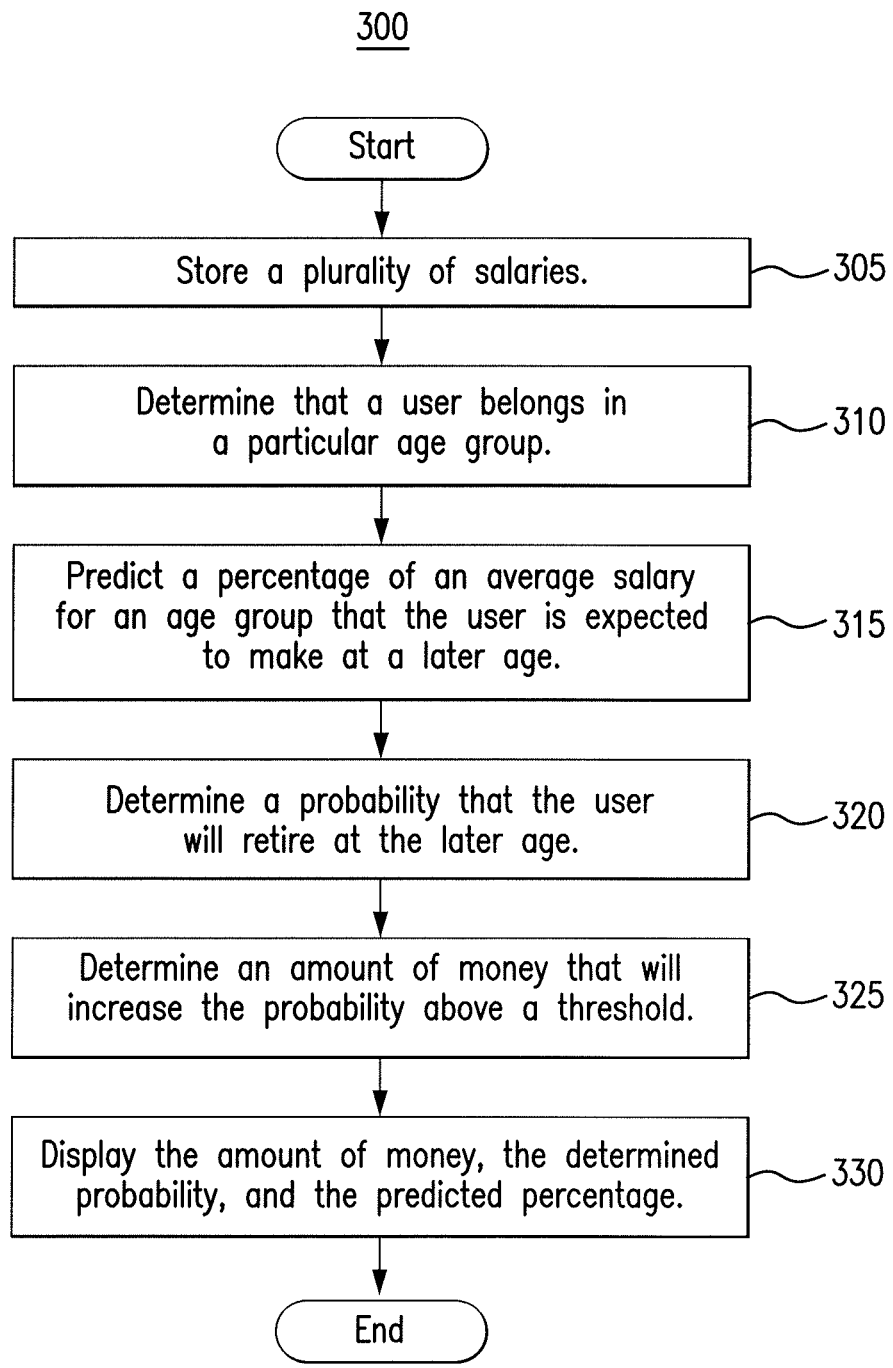
FIG. 3 is a flowchart illustrating a method for improving processor and memory usage using the system of FIG. 1.

Embodiments of the present disclosure and its advantages are best understood by referring to FIGS. 1 through 3 of the drawings, like numerals being used for like and corresponding parts of the various drawings.

When an employee retires from an enterprise, many processes and services are performed that can stress the processor and memory resources of the computing systems of the enterprise. For example, one or more replacements for the employee may need to be identified and/or hired. Furthermore, an accounting of finances may need to be conducted to determine what is owed to the employee and/or what the employee may owe to the enterprise. Additionally, any benefits that the employee may have been receiving may need to be converted and/or terminated. Performing all of these processes involves multiple units within the enterprise and leads to an increase in processor and memory resources consumed. As a result, those processor and memory resources are not used to fulfill other, perhaps more productive, tasks in the enterprise.

This problem is exacerbated when the employee retires at an inopportune or unexpected time for the enterprise. For example, if an employee delays retirement and retires at a time when other units in the enterprise are understaffed and/or on vacation, then it becomes more difficult to perform these processes at the time the employee retires. As another example, if the employee retires suddenly due to medical reasons, then these processes may need to be performed quickly and without warning. As a result, the urgent use of the processor and memory resources may result in other, perhaps more productive, tasks not being completed using the memory and processor resources.

This disclosure contemplates a prediction tool that reduces the processor and memory usage caused by employee retirement. The prediction tool examines multiple factors to predict when an employee is expected to retire. The prediction tool also determines one or more offers that can increase and/or decrease the likelihood that an employee is expected to retire at a certain time. In this manner, the prediction tool helps form expectations around employee retirement and allows the enterprise to prepare for retirement well in advance such that memory and processor resources can be budgeted properly. In certain embodiments, by using the prediction tool, memory and processor resources of the enterprise may be better budgeted when an employee retires. The prediction tool will be described in more detail using FIGS. 1 through 3. FIG. 1 will describe the prediction tool generally. FIGS. 2 and 3 will describe the prediction tool in more detail.

FIG. 1 illustrates a system 100 for improving processor and memory usage. As illustrated in FIG. 1, system 100 includes one or more devices 110, a network 115 and a prediction tool 120. In particular embodiments, system 100 improves processor and memory usage by predicting when employees in an enterprise will retire.

Device 110 is any device configured to communicate with other components of system 100. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Prediction tool 120 examines several factors and determines when an employee is expected to retire. Prediction tool 120 also examines several factors to determine offers that can alter an employee's expected retirement date. As illustrated in FIG. 1, prediction tool 120 includes a processor 125 and a memory 130. This disclosure contemplates processor 125 and memory 130 being configured to perform any of the functions of prediction tool 120 described herein.

Processor 125 is any electronic circuitry, including, but not limited to microprocessors, application specific integrated circuits (ASIC), application specific instruction set processor (ASIP), and/or state machines, that communicatively couples to memory 130 and controls the operation of prediction tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of prediction tool 120 by processing information received from network 115, device(s) 110, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Prediction tool 120 stores a plurality of salaries 135. Some of the salaries 135 may be the salaries of particular employees. For example, the salaries 135 may include the salaries that are currently being earned by certain employees. Salaries 135 may also include average salaries for particular age groups. For example, employees may be grouped by their respective ages into age groups. The salaries for the employees in each age group can be averaged to produce an average salary for each age group. The age groups and the average salaries for these age groups can then be used to determine expected salaries for employees around the time of retirement.

Prediction tool 120 receives a request to determine an expected salary for a user 140. The request may include identifying information for user 140. The request may also indicate an age for user 140. Based on that information, prediction tool 120 may determine an age group 145 that user 140 should be assigned to. Age group 145 may be the age group that user 140 currently belongs to.

Prediction tool 120 may then determine an age group 145 that user 140 will be assigned to when user 140 retires. For example, prediction tool 120 may maintain a retirement age group for the age range 55 to 65. Prediction tool 120 may then determine an expected salary 150 for user 140 when user 140 is in the retirement age group. The retirement age group may not be the age group 145 that user 140 is currently assigned to.

Prediction tool 120 may determine expected salary 150 by first predicting a percentage of the average salary for the retirement age group that the user 140 will make at a retirement age. For example, prediction tool 120 may determine a percentage of the average salary for each age of the retirement age group.

Prediction tool 120 may determine an expected salary 150 for user 140 by interpolating the salaries 135 of the users in the retirement age group to produce an expected salary curve for the retirement age group. For example, prediction tool 120 may perform one or more interpolation methods based on salaries of users in the retirement age group and the age of the users in the retirement age group to produce the expected salary curve, which tracks an expected salary across the different ages of the retirement age group. This disclosure contemplates prediction tool 120 using any appropriate interpolation method such as, for example, linear interpolation, polynomial interpolation, spline interpolation, etc. The expected salary curve reveals a percentage of the average salary of the retirement age group that users will make at different ages in the retirement age group. Prediction tool 120 can then use these percentages to determine expected salary 150. For example, prediction tool 120 may determine that in the first year of the retirement age group, a user is expected to earn 60 percent of the average salary of the retirement age group. Prediction tool 120 can also determine that in the second year of the retirement age group, a user is expected to earn 65 percent of the average salary of the retirement age group. Based on this information, prediction tool 120 can determine an expected salary 150 for the user for each year of the retirement age group. This disclosure contemplates prediction tool 120 determining an expected salary 150 for any age and an expected salary curve for any age group.

Prediction tool 120 can then determine a retirement probability 155 for a user. Retirement probability 155 indicates the probability that a user will retire at each age of the retirement age group. For example, retirement probability 155 may indicate that a user has a 20 percent chance of retiring during the first year of the retirement age group and that the user has an 80 percent chance of retiring during the last year of the retirement age group. Prediction tool 120 may determine retirement probability 155 by examining any number of factors. For example, prediction tool 120 may analyze expected salary 150, users 140 current salary, users 140 current level of retirement savings, and users 140 accrued level of vacation time. This disclosure contemplates prediction tool 120 determining retirement probability 155 for any age and/or age group.

This disclosure contemplates prediction tool 120 analyzing any appropriate factor to determine retirement probability 155. For example, prediction tool 120 may examine demographic data for a geography of user 140. Prediction tool 120 may track average retirement ages, average retirement income, average retirement savings, etc. for the demographic of the geography of user 140. Based on that information, prediction tool 120 may determine whether user 140 is expected to earn and save as much as those in the same demographic and geography as user 140. If so, user 140 is more likely to retire by a certain age. Prediction tool 120 may also examine benefits provided by an enterprise or an employer of user 140 such as, for example, health insurance and/or life insurance. In many instances, if the employer provides health insurance and/or life insurance up until retirement, then user 140 is less likely to retire by a certain age.

Prediction tool 120 may determine an offer 160 based on retirement probability 155. For example, prediction tool 120 may determine an amount of money that, if given to user 140, will raise retirement probability 155 above a threshold. As another example, prediction tool 120 may determine a length of time to extend benefits that will raise retirement probability 155 above the threshold. By determining offers 160, prediction tool 120 determines scenarios in which user 140 can be motivated to retire by a certain age. In this manner, user's 140 retirement can be planned and expected by the enterprise thus resulting in processor and memory usage savings at the time user 140 retires.

In particular embodiments, prediction tool 120 may also determine a cost of replacing user 140 after user 140 retires. For example, prediction tool 120 can determine expected salaries for one or more replacement employees of user 140 after user 140 retires. The determined cost may help an enterprise determine whether a particular offer 160 is reasonable. For example, if the cost of replacing a user 140 is high, then offer 160 may also need to be high to motivate user 140 to retire by a certain age.

In particular embodiments, system 100 improves processor and memory usage by predicting the probability that a user 140 will retire by a certain age and the offers that can encourage and/or motivate the user to retire by that age. In this manner, system 100 allows an enterprise to plan and prepare for a user's 140 retirement. Prediction tool 120 will be described in more detail using FIGS. 2 and 3.

FIG. 2 illustrates the prediction tool 120 of the system 100 of FIG. 1. As illustrated in FIG. 2, prediction tool 120 includes a prediction engine 200 and an offer engine 205. In particular embodiments, prediction tool 120 improves the processor and memory resource usage of an enterprise by preparing the enterprise for the retirement of a user 140.

Prediction engine 200 may receive information about user 140. Then based on that information, prediction engine 200 may determine an age group 145 that the user 140 currently belongs to. Prediction engine 200 may also determine a retirement age group for user 140. The retirement age group and age group 145 may be different age groups.

Prediction engine 200 may then determine a percentage 210 of the average salary of the retirement age group. Prediction engine 200 may also determine an average salary 215 for the retirement age group. Prediction engine 200 may determine the average salary 215 by averaging the salaries of users who are currently in the retirement age group. For example, if the retirement age group spans ages 55 through 65, then prediction engine 200 may determine average salary 215 by averaging the salaries of the users who are currently ages 55 through 65. Prediction engine 200 may determine percentage 210 of the average salary of the retirement age group by interpolating the salaries of the users who are currently in the retirement age group. By interpolating the salaries based on age, prediction engine 200 may produce an expected salary curve based on age. Based on that information, prediction engine 200 may then determine percentage 210 of the average salary of the retirement age group that a user is expected to earn during each year of the retirement age group.

Prediction engine 200 then determines an expected salary 150 for user 140 using the average salary for the retirement age group 215 and the percentage 210 of the average salary of the retirement age group. Prediction engine 200 may determine an expected salary 150 for user 140 during each year of the retirement age group. Prediction engine 200 may use expected salary 150 to determine a retirement probability 155. Retirement probability 155 may indicate the probability that user 140 will retire during each year of the retirement age group. For example, prediction engine 200 may determine that user 140 has a 20 percent chance of retiring during year one of the retirement age group and an 80 percent chance of retiring during the final year of the retirement age group.

An example algorithm for prediction engine 200 is as follows: wait for request about user 140; receive request about user 140; determine an age group that user 140 currently belongs to; determine a retirement age group for user 140; determine an average salary for the retirement age group by averaging the salaries of other users who are currently in the retirement age group; determine a percentage of the average salary for each age of the retirement age group by interpolating the salaries of the users who are currently in the retirement age group; determine an expected salary for the user for each age of the retirement age group based on the average salary for the retirement age group and the percentage of the average salary of the retirement age group for each age of the retirement age group; and determine a retirement probability using the expected salary.

In particular embodiments, prediction engine 200 may determine retirement probability 155 based on other factors. For example, prediction engine 200 may determine retirement probability 155 by analyzing retirement savings of user 140, an amount of vacation or paid time off of user 140, demographic information of a geography of user 140, for example, an average retirement age of a zip code of user 140, and/or a benefit provided by an employer of user 140.

Offer engine 205 receives retirement probability from prediction engine 200. Based on retirement probability 155, offer engine 205 may determine an offer 160 that increases and/or decreases the probability that user 140 will retire by a particular age. Offer engine 205 may receive a threshold 220 such as, for example, from a user 105 of system 100. Threshold 220 may indicate a desired threshold probability for user 140 to retire by a certain age. If retirement probability 155 is lower than threshold 220, offer engine 205 may determine offer 160 that, if given to the user, will encourage or motivate the user 140 to retire, thereby raising retirement probability 155 above threshold 220. Offer 160 may include an amount of money, an amount of vacation, an amount of time to extend benefits, etc. The amount of money may be a lump sum payment, an annuitized payment, a deferred payment, etc. This disclosure contemplates offer 160 including any combination of money, vacation, extended benefits, etc. An example algorithm for offer engine 205 is as follows: wait for retirement probability 155 from prediction engine 200; receive retirement probability 155 from prediction engine 200; compare retirement probability 155 to threshold 220; and determine one or more offers 160 based on retirement probability 155.

Prediction engine 200 and offer engine 205 may communicate percentage 210, average salary 215, expected salary 150, retirement probability 155 and/or offer 160 for display to a user 105 of system 100. User 105 may see this information and determine how best to approach user 140 concerning retirement. For example, user 105 may determine a way to encourage user 140 to retire by a certain age. Additionally, user 105 may see the information and expect that user 140 will retire by a particular age. In particular embodiments, by preparing user 105 for user's 140 retirement at a particular age, prediction tool 120 improves the processor and memory usage of user 105 around the time user 140 retires.

FIG. 3 illustrates a method 300 for improving processor and memory usage. In particular embodiments, prediction tool 120 performs method 300. By performing method 300, prediction tool 120 improves processor and memory usage by preparing an enterprise for the retirement of a user.

Prediction tool 120 begins by storing a plurality of salaries in step 305. The salaries may be the current salary for users of an enterprise. The salaries may also include average salaries for age groups of the users in the enterprise. Prediction tool 120 then determines that a user belongs in a particular age group in step 310. Then in step 315, prediction tool 120 predicts a percentage of an average salary for an age group such as, for example, a retirement age group that the user is expected to make at a later age. In step 320, prediction tool 120 determines a probability that the user will retire at the later age. Then in step 325, prediction tool 120 determines an amount that will increase the determine probability above a threshold. Prediction tool 120 then displays the amount of money, the determined probability and the predicted percentage in step 350.

Modifications, additions, or omissions may be made to method 300 depicted in FIG. 3. Method 300 may include more, fewer, or other steps. For example, steps may be performed in parallel or in any suitable order. While discussed as prediction tool 120 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system comprising:
   an interface;
   a memory configured to store:
      a plurality of salaries, each salary of the plurality of salaries is a salary for a user of a plurality of users, each user of the plurality of users assigned to an age group of a plurality of age groups; and
      an average salary for each age group of the plurality of age groups; and
   a hardware processor communicatively coupled to the memory, the hardware processor configured to:
      determine that a first user is of a first age that belongs in a first age group of the plurality of age groups;
      predict, based on the salaries for the users in a second age group different from the first age group, a percentage of the average salary for the second age group that the first user will make at a second age greater than the first age, wherein the percentage of the average salary for the second age group that the first user will make at the second age is predicted by:
         interpolating the salaries of the users in the second age group to produce an expected salary curve for the second age group;
         determining an average salary for the second age group; and
         determining, for each age of the second age group, based on the expected salary curve and the average salary for the second age group, a percentage of the average salary for the second age group that a user is expected to make at that age; and
      determine a probability that the first user will retire at the second age based on the predicted percentage of the average salary; and an offer engine configured to:
      determine an amount of money that, if given to the first user, will increase the determined probability above a threshold; and
      display, on the interface, the amount of money, the determined probability, and the predicted percentage, wherein computing resources of an organization are allocated based on the determined probability.

2. The system of claim 1, wherein the prediction engine is further configured to determine the probability that the first user will retire at the second age further based upon an amount of savings of the user.

3. The system of claim 1, wherein the prediction engine is further configured to determine the probability that the first user will retire at the second age further based upon an amount of paid time off of the user.

4. The system of claim 1, wherein the prediction engine is further configured to determine the probability that the first user will retire at the second age further based upon an average retirement age in a zip code associated with the user.

5. The system of claim 1, wherein the prediction engine is further configured to determine the probability that the first user will retire at the second age further based upon a benefit provided by an employer of the user.

6. The system of claim 1, wherein the offer engine is further configured to determine a cost of replacing the user after the user retires.

7. A method comprising:
   storing, on at least one storage device, a plurality of salaries, each salary of the plurality of salaries is a salary for a user of a plurality of users, each user of the plurality of users assigned to an age group of a plurality of age groups;
   storing, on the at least one storage device, an average salary for each age group of the plurality of age groups; and
   determining, by at least one hardware processor communicatively coupled to the at least one storage device, that a first user is of a first age that belongs in a first age group of the plurality of age groups;
   predicting, by the at least one hardware processor, based on the salaries for the users in a second age group different from the first age group, a percentage of the average salary for the second age group that the first user will make at a second age greater than the first age, wherein the percentage of the average salary for the second age group that the first user will make at the second age is predicted by:
      interpolating the salaries of the users in the second age group to produce an expected salary curve for the second age group;
      determining an average salary for the second age group; and
      determining, for each age of the second age group, based on the expected salary curve and the average salary for the second age group, a percentage of the average salary for the second age group that a user is expected to make at that age;
   determining, by the at least one hardware processor, a probability that the first user will retire at the second age based on the predicted percentage of the average salary;
   determining, by the at least one hardware processor, an amount of money that, if given to the first user, will increase the determined probability above a threshold; and
   displaying, on an interface, the amount of money, the determined probability, and the predicted percentage, wherein computing resources of an organization are allocated based on the determined probability.

8. The method of claim 7, further comprising determining the probability that the first user will retire at the second age further based upon an amount of savings of the user.

9. The method of claim 7, further comprising determining the probability that the first user will retire at the second age further based upon an amount of paid time off of the user.

10. The method of claim 7, further comprising determining the probability that the first user will retire at the second age further based upon an average retirement age in a zip code associated with the user.

11. The method of claim 7, further comprising determining the probability that the first user will retire at the second age further based upon a benefit provided by an employer of the user.

12. The method of claim 7, further comprising determining a cost of replacing the user after the user retires.

13. An apparatus comprising:
   a memory; and
   a hardware processor communicatively coupled to the memory, the hardware processor configured to:
      determine that a first user is of a first age that belongs in a first age group of a plurality of age groups;
      predict, based on stored salaries for users in a second age group different from the first age group, a percentage of an average salary for the second age group that the first user will make at a second age greater than the first age, wherein the percentage of the average salary for the second age group that the first user will make at the second age is predicted by:
         interpolating the salaries of the users in the second age group to produce an expected salary curve for the second age group;
         determining an average salary for the second age group; and
         determining, for each age of the second age group, based on the expected salary curve and the average salary for the second age group, a percentage of the average salary for the second age group that a user is expected to make at that age; and
      determine a probability that the first user will retire at the second age based on the predicted percentage of the average salary; and an offer engine configured to:
      determine an amount of money that, if given to the first user, will increase the determined probability above a threshold; and
      display the amount of money, the determined probability, and the predicted percentage, wherein computing resources of an organization are allocated based on the determined probability.

14. The apparatus of claim 13, wherein the prediction engine is further configured to determine the probability that the first user will retire at the second age further based upon an amount of savings of the user.

15. The apparatus of claim 13, wherein the prediction engine is further configured to determine the probability that the first user will retire at the second age further based upon an amount of paid time off of the user.

16. The apparatus of claim 13, wherein the prediction engine is further configured to determine the probability that the first user will retire at the second age further based upon an average retirement age in a zip code associated with the user.

17. The apparatus of claim 13, wherein the prediction engine is further configured to determine the probability that the first user will retire at the second age further based upon a benefit provided by an employer of the user.

18. The apparatus of claim 13, wherein the offer engine is further configured to determine a cost of replacing the user after the user retires.

* * * * *